Patented Oct. 13, 1936

2,057,413

UNITED STATES PATENT OFFICE 2,057,413

TREATING PLANT MATERIAL

Walter A. Bridgeman and J. Allington Bridgman, Owego, N. Y., assignors, by mesne assignments, to Innis, Speiden & Co., a corporation of Delaware No Drawing. Application April 20, 1934, Serial No. 721,639

4 Claims. (Cl. 47—58)

This invention relates to the treatment of plant material and is particularly directed to the coating of nursery stock, plant cuttings, roots, bulbs and the like with protective coating by the use of an emulsion characterized by containing carnauba wax.

Nursery stock and similar plant material have been given protective and preservative coatings by dipping in melted paraffin. This method, however, involves a number of serious disadvantages. It is difficult to control the temperature of a hot paraffin bath and it is therefore very easy to seriously injure plant life because of too high a temperature of the dipping bath. When the bath is held just slightly above the melting point, a thick film of paraffin is deposited because it solidifies very quickly with no drainage of excess material.

A thick coating tends to flake off, particularly if the stock is stored for any length of time. This creates an unsightly appearance and gives the impression of mold or mildew on the stock. When the coating chips off, desiccation becomes more rapid. When using paraffin as a coating it is frequently necessary to add a dyestuff to the paraffin in order to restore the natural color to the stock.

We have found that these and other disadvantages may be avoided, and highly satisfactory results obtained by using as a coating medium an emulsion of carnauba wax, with or without additional ingredients. Such emulsions may be applied cold, thus avoiding all danger of injury to the plant material. It is possible to apply the emulsions by spraying to trees and shrubs, which it would be impossible to dip in a hot paraffin bath. A particular advantage of the carnauba wax emulsions is that they dry to a transparent, lustrous film so that the addition of color is not necessary although it may be used if desired for some purposes.

A further advantage of the emulsions used in accordance with the invention is their high covering power, which is due to the proper adjustment of the surface tension of the emulsions. The preferred compositions have a surface tension approximately half that of water which gives a covering power two to three times as great as that of melted paraffin. In particular, compositions having a surface tension of from 33 to 45 dynes per centimeter at 20° C. have been found to be especially suitable for the coating of plant material, the surface tension being determined on a du Nouy surface tension apparatus such as was described by P. Lecomte du Nouy in "The Journal of General Physiology", May 29, 1919, Vol. 1, No. 5, pages 521 to 524, inclusive, which apparatus shows a surface tension value, at 20° C., for water distilled in glass of 69.3 dynes per centimeter.

The emulsions are obtained by dispersing carnauba wax in amounts of from about 5% to 25% of the composition, with or without other substances, in an aqueous solution of a suitable emulsifying agent. Soaps such as sodium oleate and triethanolamine oleate are suitable emulsifying agents and may be used in amounts of from 1 to 8%. Other bases, such as potassium hydroxide and ammonia and other fatty acids, such as stearic or linoleic acid may also be used in whole or in part. A highly satisfactory emulsion for the treatment of plant material in accordance with the invention has the following composition:

|  | Per cent |
|---|---|
| Carnauba wax | 23.0 |
| Sodium and triethanolamine oleate | 5.8 |
| Water | 71.2 |

Such an emulsion may be made as follows:

125 pounds of carnauba wax is melted with 22 pounds of oleic acid at 85–90° C. A solution is made up of 1 pound of caustic soda and 10 pounds of triethanolamine in 30 pounds of water and the solution is heated to 90° C. This solution is stirred into the wax-oleic acid mixture at the same temperature, and thoroughly mixed. A jelly-like mass is formed. To this, water at 90° C. is added slowly until a total weight of 550 pounds is reached. The product is an emulsion suitable for the treatment of nursery stock. For some purposes it may be further diluted.

The emulsions may be applied to the plant material in various ways. Preferably the nursery stock or other plant material is dipped into the emulsion. The emulsion may also be sprayed onto the plant material or it may be applied with a brush. The emulsions dry sufficiently fast so that the material can be handled and packed without delay. When large amounts of material are being treated forced drying may be used. The film when drying is never tacky, so that the material may be handled without injuring the coating. The thickness of the coating can readily be controlled by dilution of the emulsions with water, thus making it possible to apply a heavier coating for dormant plants and a thin coating for growing plants.

It has been found possible to treat rose bushes in the fall by the method of the invention, whereas the common practice heretofore has been to paraffin rose bushes just before shipment. The advantage of treating the bushes in the fall lies in the fact that during a warm winter considerable desiccation would normally take place, which desiccation is prevented by the application of coatings by the method of the invention. The coatings thus produced are sufficiently permanent that it is not necessary to recoat the bushes in the spring.

Other waxes, such as candelilla wax, beeswax, paraffin and ceresin may be substituted in part for the carnauba, but in general such substitutes tend to dull the luster of the coating.

The ratio of wax to fatty acid in the emulsion may be varied to some extent. Variations in the composition and percentage of the emulsifying agent affect the surface tension of the emulsion, the luster of the coating and the water repellency of the film resulting from the use of the emulsion.

It is sometimes advantageous to add to the emulsions alkali metal or ammonium salts of casein or of gums or resins, such as rosin, shellac, pontianak gum, in amounts of from 5 to 40% of the amount of wax used. Water soluble and wax soluble dyes may be added to the emulsions, as well as metallic powders, such as bronze or aluminum powder. A wax emulsion such as described above, to which has been added 3 to 10% by weight of bronze or aluminum powder makes an excellent coating material for producing decorative effects on wreaths, evergreens, pine cones, and the like, or on any material not subjected to heat where a hard, lustrous, bronze or aluminum finish is desired.

It has also been found desirable to add fungicidal agents to the emulsions for the treatment of plants and plant materials. Colloidal sulphur has been found to be particularly effective in combination with emulsion compositions of the type described herein. This material is recognized to be a highly effective fungicide of particular value for the common rose diseases, especially when the roses are in storage. An application of colloidal sulphur alone is not very permanent as it can be easily washed off. However, colloidal sulphur can be added to the emulsions and when the resulting compositions are applied to plants or plant material the film produced holds the sulphur on the plant.

We claim:

1. Process of preserving a living woody plant incident to transplantation thereof, which comprises coating surfaces of the plant with an aqueous emulsion comprising a waxy component including carnauba wax, and an emulsifying agent thus producing on the plant a thin transparent coating having quick-drying and non-tacky properties and harmless to plant growth.

2. Process of preserving a living woody plant incident to transplantation thereof, which comprises coating surfaces of the plant with an aqueous emulsion comprising a waxy component including carnauba wax, a substance of the group consisting of casein, rosin, shellac and pontianak gum, and an emulsifying agent thus producing on the plant a thin transparent coating having quick-drying and non-tacky properties and harmless to plant growth.

3. Process of preserving a living woody plant incident to transplantation thereof, which comprises coating surfaces of the plant with an aqueous emulsion comprising a waxy component including carnauba wax, and an emulsifying agent, the said emulsion having a surface tension approximately one-half that of water thus producing on the plant a thin transparent coating having quick-drying and non-tacky properties and harmless to plant growth.

4. Process of preserving a living woody plant incident to transplantation thereof, which comprises coating surfaces of the plant with an aqueous emulsion comprising a waxy component including carnauba wax, and an emulsifying agent, the said emulsion having a surface tension from 33 to 45 dynes per centimeter at 20° C. thus producing on the plant a thin transparent coating having quick-drying and non-tacky properties and harmless to plant growth.

WALTER A. BRIDGEMAN.
J. ALLINGTON BRIDGMAN.